Figure 1:
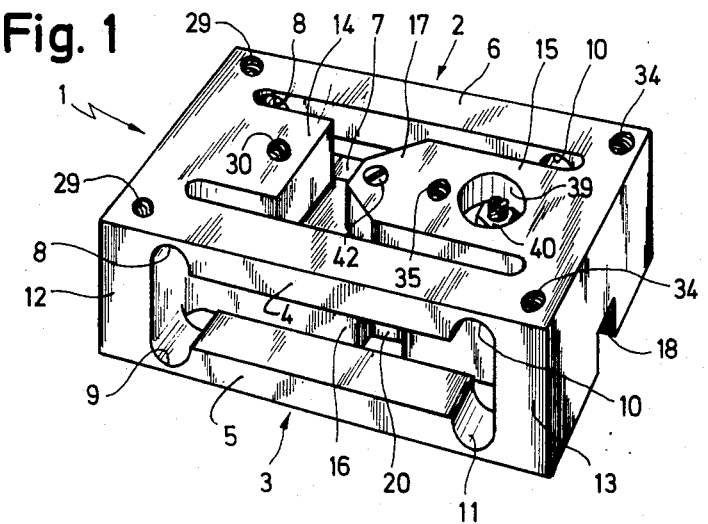

United States Patent [19]

Jetter

[11] Patent Number: 4,505,345
[45] Date of Patent: Mar. 19, 1985

[54] FORCE MEASURING DEVICE

[75] Inventor: Hans Jetter, Balingen, Fed. Rep. of Germany

[73] Assignee: Bizerba-Werke Wilhelm Kraut GmbH & Co. KG, Fed. Rep. of Germany

[21] Appl. No.: 442,914

[22] Filed: Nov. 19, 1982

[30] Foreign Application Priority Data

Dec. 1, 1981 [DE] Fed. Rep. of Germany ....... 3147470

[51] Int. Cl.³ .............................................. G01G 3/14
[52] U.S. Cl. ..................... 177/211; 177/229; 73/862.65
[58] Field of Search ................. 73/862.65; 177/210 C, 177/211, 229; 29/428

[56] References Cited

U.S. PATENT DOCUMENTS

| 3,805,604 | 4/1974 | Ormond | 73/862.65 X |
| 4,170,270 | 10/1979 | Sette et al. | 177/229 X |
| 4,196,784 | 4/1980 | Suzuki et al. | 73/862.65 X |
| 4,300,646 | 11/1981 | Melcher et al. | 177/229 X |
| 4,300,648 | 11/1981 | Gallo et al. | 177/229 |

FOREIGN PATENT DOCUMENTS 2431689 3/1980 France ................................ 177/229

Primary Examiner—E. A. Goldberg
Assistant Examiner—Patrick W. Foster
Attorney, Agent, or Firm—Kramer and Brufsky

[57] ABSTRACT

A force measuring device, in particular a weighing unit, is formed in a one-piece block. First and second spaced parallelogram guides are provided with a load supporting surface. An independent bending measuring body is mounted on the block equidistant between the parallelogram guides. A force introducing unit transmits a force from a load bearing on the parallelogram guides to the bending measuring body. A pair of crosspieces connect opposite ends of the first parallelogram guide to corresponding opposite ends of the second parallelogram guide. A first cantilevered projection protrudes from one of the crosspieces equidistant from the parallelogram guides, and a second cantilevered projection protrudes from the other crosspiece equidistant from the parallelogram guides. The bending measuring body is loaded by attaching it to the second cantilevered projection while the first cantilevered projection is attached to the force introducing unit.

16 Claims, 19 Drawing Figures

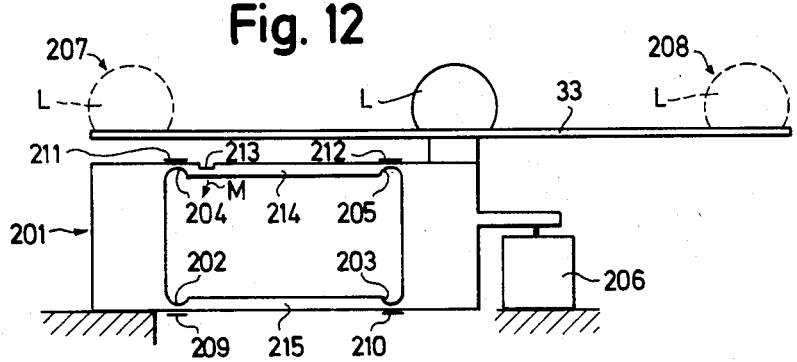
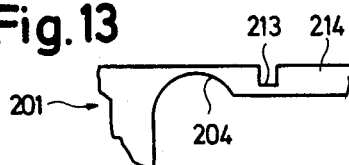 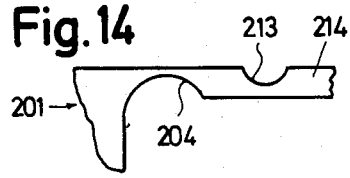
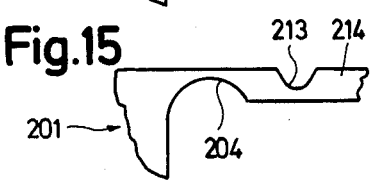 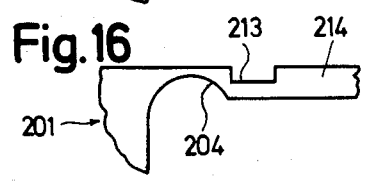
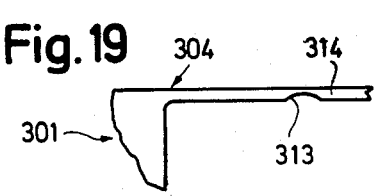 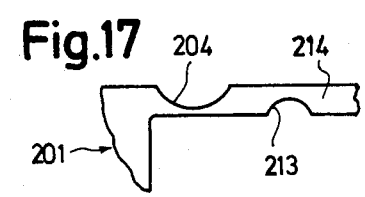
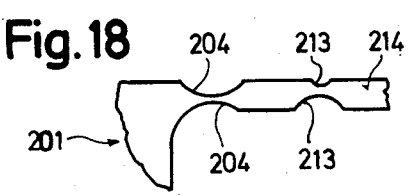

FORCE MEASURING DEVICE

The invention relates to a force measuring device, in particular a weighing unit, having at least one parallelogram guide worked from a one-piece block and a bending measuring body, into which a force bearing on the parallelogram guide is introducable via a force introducing unit.

In the case of a known force measuring device of this type (DE-OS No. 29 17 169) the arms of a parallelogram guide worked from a one-piece block extend above or below a bending measuring body also formed in one piece with the block. This leads to the force measuring device being of a relatively tall construction so that it cannot be built into flat weighing machines. In addition, the upper and lower sides of the bending measuring body, which have to accommodate the customary strain measuring elements, in particular wire strain gauges, are covered by the arms of the parallelogram guide so that these measuring elements may be mounted and hermetically encapsulated only with difficulty.

The object of the invention is to design a device of the type in question such that its construction is as low as possible and the strain measuring elements may be mounted and encapsulated in a simple way.

This object is accomplished according to the invention by the following features:

(a) two parallelogram guides worked from a one-piece block are provided;
(b) there is a free space between the parallelogram guides;
(c) the bending measuring body is designed as an independent constructional unit and
(d) arranged centrally in the space between the two parallelogram guides.

Figure 2:
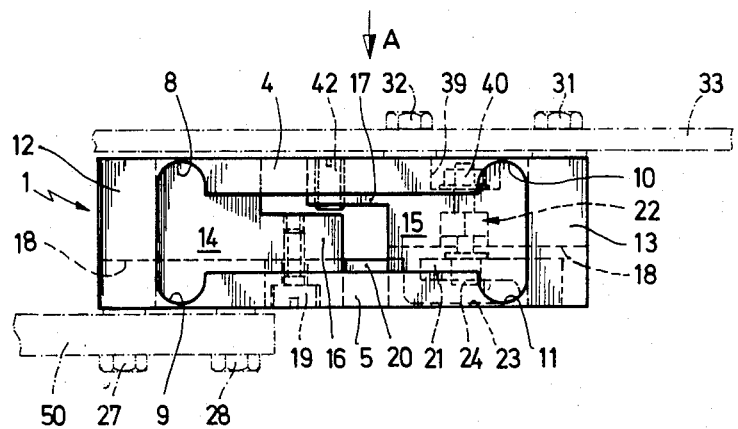
Figure 3:
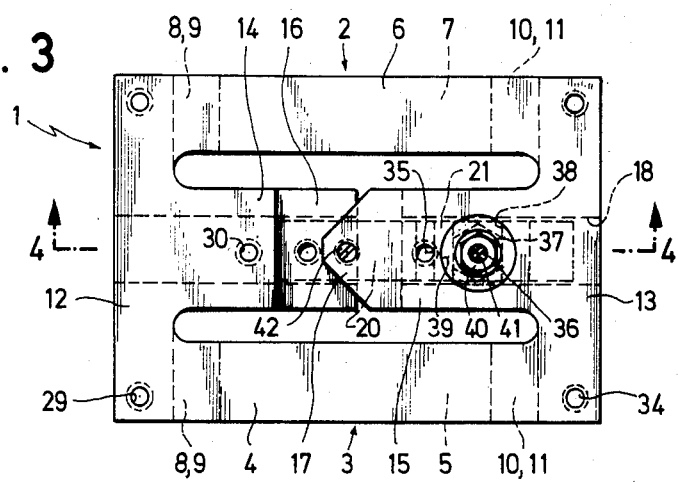
Figure 4:
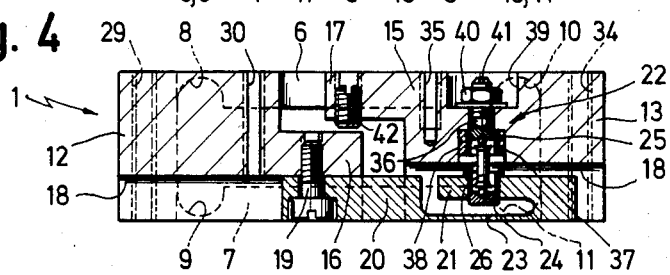
Figure 5:
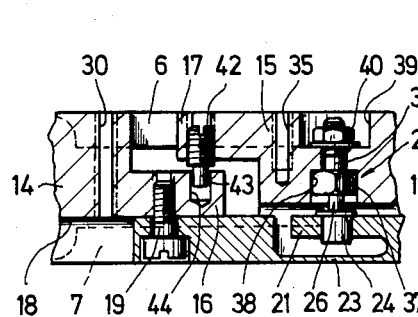
Figure 6:
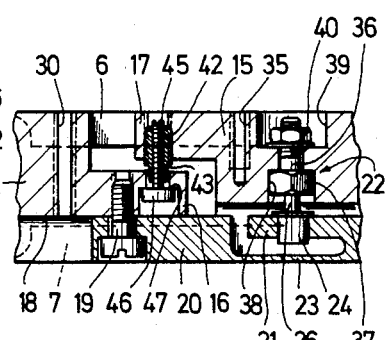
Figure 7:
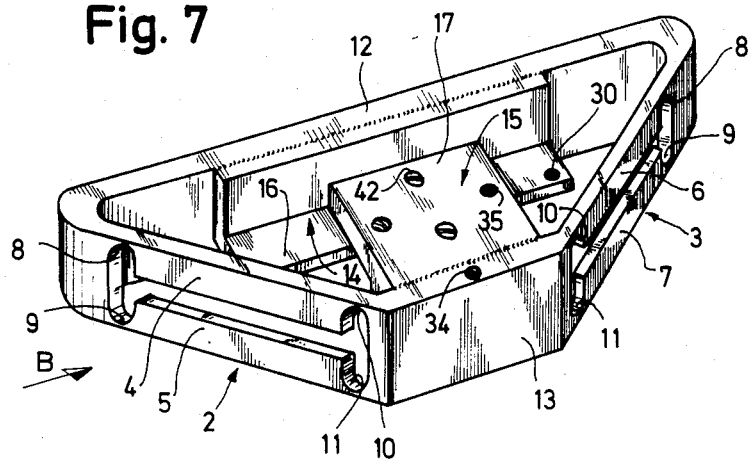
Figure 8:
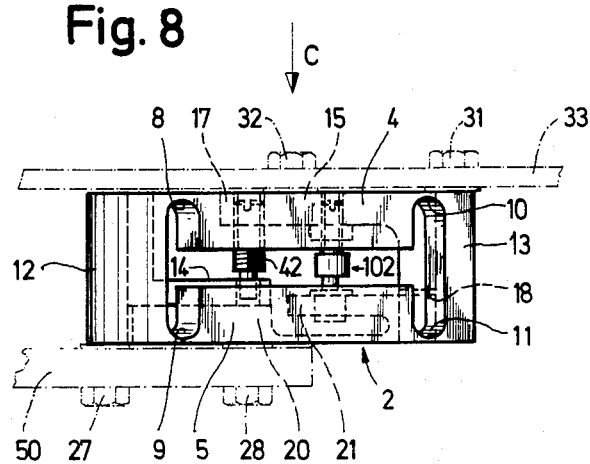
Figure 9:
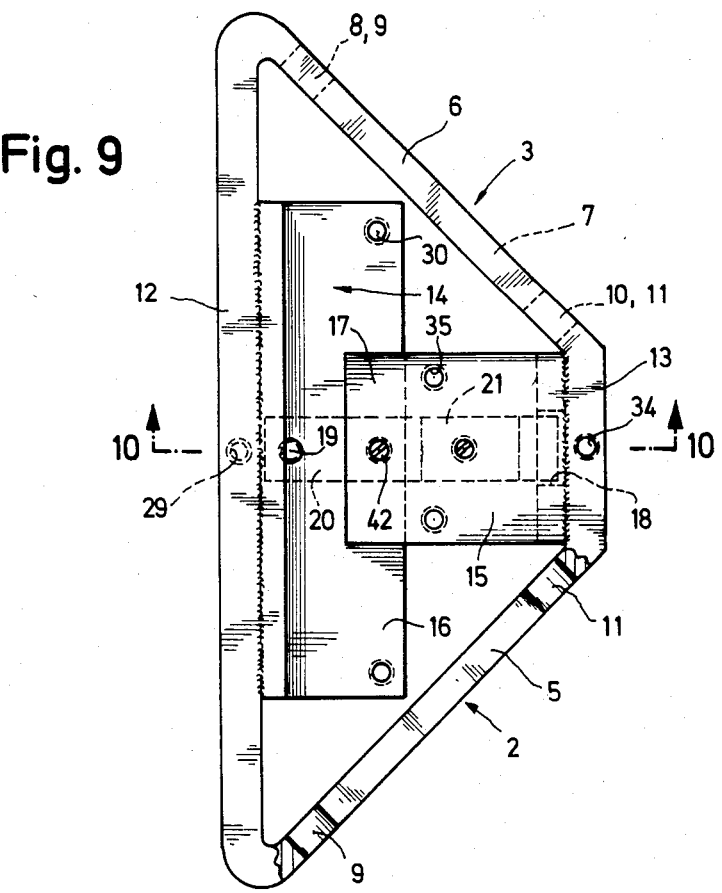
Figure 10:
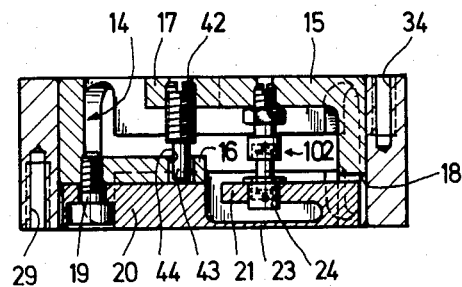
Figure 11:
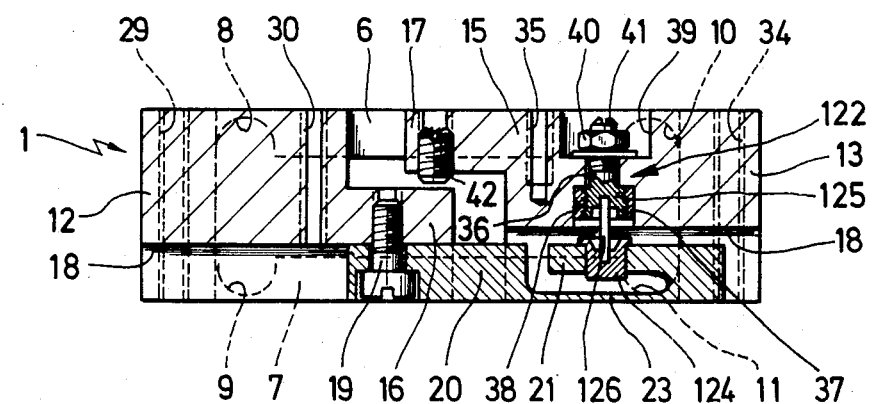

The following description of a preferred embodiment according to the invention serves to explain the invention further in conjunction with the attached drawings, which show:

FIG. 1 a diagrammatic view of a first embodiment of a force measuring device according to the invention;

FIG. 2 a side view of the device from FIG. 1;

FIG. 3 a plan view of the device in the direction of arrow A in FIG. 2;

FIG. 4 a sectional view along the line 4—4 in FIG. 3;

FIG. 5 a part-sectional view of a modified device according to FIG. 4;

FIG. 6 a part-sectional view of a further modified device according to FIG. 4;

FIG. 7 a second embodiment of a force measuring device according to the invention;

FIG. 8 a side view of the force measuring device in the direction of arrow B in FIG. 7;

FIG. 9 a plan view of the device in the direction of arrow C in FIG. 8;

FIG. 10 a sectional view along the line 10—10 in FIG. 9;

FIG. 11 an elastic force introducing unit;

FIG. 12 a schematic side view of a parallelogram guide having a load plate corresponding approximately to the side view in FIG. 2 or FIG. 8;

FIGS. 13 to 18 partial views of modified embodiments of the parallelogram guide illustrated in FIG. 12 and FIG. 19 a further modified embodiment of a parallelogram guide in partial view.

Two parallelogram guides 2, 3 lying in parallel planes are worked in one piece by corresponding milling out from a metal block 1 shaped substantially like a parallelepiped and made from, for example, steel or aluminum. Each guide 2, 3 consists of upper and lower arms 4,5 or 6, 7, respectively, which are each connected at joint positions 8, 9, 10, 11 with crosspieces 12, 13 disposed at the outer sides of the block and also formed in one piece with this block. A stepped projection 14 protrudes from crosspiece 12 and a stepped projection 15 protrudes from crosspiece 13, both cantilevered into the free space remaining between the parallelogram guides 2, 3. These projections 14, 15 overlap each other with their free end areas 16, 17, thus forming a space inbetween (FIGS. 2 and 3).

The block 1 has a groove 18 disposed through its centre, in which a bending measuring body 20, designed as an independent constructional unit, is held cantilevered by means of a screw 19. For introducing force the bending measuring body 20 has a bent back arm 21, on which the force introducing unit, designated as a whole as 22, engages. The strain measuring elements in the form of wirestrain gauges are mounted and encapsulated in the usual way on a part of the bending measuring body 20 designated as 23.

The force introducing unit 22 - cf. FIG. 4—comprises a cup 24 rigidly secured to the bent back arm 21 of the bending measuring body 20 as well as a further cup 25 secured to the projection 15, a pressure rod 26, which is mounted on ball bearings, extending between the two cups. A force exerted on the projection 15 is consequently introduced into the bent back arm 21 via the pressure rod 26 so that the part 23 of the bending measuring body 20 bends accordingly and the force can be indicated in the customary way via the above-mentioned wire strain gauges.

If the force measuring device described is built into a weighing machine as a weighing unit the block 1 - cf. FIG. 2—will be mounted on a stationary base 50 in the region of the crosspiece 12 and the projection 14 protruding from this by means of screws 27, 28; these screws 27, 28 engage in threaded holes 29 or 30, which are provided in the crosspiece 12 or in the projection 14. In order to apply a load to be weighed a load plate 33 is secured by means of screws 31, 32 to the crosspiece 13 and the projection 15 protruding from this. The screws 31, 32 engage in threaded holes 34, 35 in the crosspiece 13 or the projection 15, respectively. The load plate 33 is thereby advantageously placed such that the centre of its area is located on the central plane between the parallelogram guides 2, 3 and in the centre between the joint positions 8, 9, 10, 11.

The force introducing unit 22 is (with the exception of the cup 24 securely disposed in the bent back arm 21) disposed for transverse displacement in the projection 15 in order to be able to bring the force introduction to the actual centre of gravity of the surface of the two parallelogram guides. For this purpose a threaded bolt 36 comprising the cup 25 is screwed into a nut 37, which is displaceable in a groove 38 extending in the projection 15 transversely to the arms of the parallelogram guides 2, 3 (FIGS. 4, 5 and 6). The threaded shaft 36 projects with its free end into a blind hole 39 opposite tne groove 38 where a further nut 40 holds together the arrangement described. The blind hole 39 is of such a size that, after the nut 40 has been loosened, the nut 37 can be displaced over a certain distance which is sufficient for the necessary adjustment. Finally, a slit 41

(FIG. 4) is provided in the free end of the threaded bolt 36 located in the blind hole 39 for engagement by a screwdriver. In this way the initial load bearing on the bending measuring body 20 can be set.

With the aid of the described adjustability of the force introducing unit 22 the corner sensitivity of the force measuring device in a direction extending transversely to the direction of the arms of the parallelogram guides 2, 3 can be adjusted. This direction extends, of course, parallel to the longitudinal axis of groove 38, in which the nut 37 is displaceable. The corner sensitivity in the direction extending transversely hereto and parallel to the arms of the parallelogram guides 2, 3 is adjusted in that the middle, vertical spaces between the joints 8, 9 or 10, 11 are modified on both sides by the removal of material, e.g. by milling.

In addition, the force measuring device according to FIGS. 1 to 4 has an overload stop. This is formed by a headless screw 42 screwed into the end area 17 of the projection 15. When an overload occurs this headless screw abuts with its free end on the end area 16 of the projection 14 lying below it and thereby prevents any further bending of the projection 15 downwards. By adjusting the screw 42 the nominal value of the overload is adjustable.

In the case of the embodiment illustrated in FIG. 5 a pin 43 protrudes from the end of screw 42, which forms the actual overload stop. This pin dips freely into a corresponding recess 44 in the projection 14. This rules out any twisting of the parallelogram guides relative to each other connected with any displacement, relative to each other, of the overlapping end areas 16, 17 of projections 14 and 15 in the plane of drawing of FIG. 3.

In the case of the additionally modified embodiment shown in FIG. 6 another screw 45 is screwed into the pin 43 from below. The head 46 of this screw abuts on a shoulder 47 in the end area 16 of the projection 14. This rules out any spreading apart of the overlapping end areas 16, 17 of projections 14, 15 in the plane of drawing of FIG. 6. The screw 46 has a slit at its end opposite to the head 46 for insertion of a screwdriver. This enables the appropriate adjustment of the head 46 to be carried out. A slit serving for adjustment of the headless screw 42 extends in this case laterally of the shaft of screw 45.

In the case of the described embodiment of a force measuring device according to FIGS. 1 to 6 the two parallelogram guides 2, 3 extend parallel to each other. In the second embodiment of a force measuring device illustrated in FIGS. 7 to 10 the two parallelogram guides 2, 3 are arranged relative to each other at an angle varying from zero, preferably between about 60° and 120°, in particular 90°. For both embodiments corresponding parts have been given the same reference numerals. The two parallelogram guides 2, 3 form between them, in the illustrated embodiment, an angle of 90°. They are connected in the area of the joint positions 8, 9 by the long crosspiece 12 and in the area of the joint positions 10, 11 by the short crosspiece 13. The projection 14 protrudes from crosspiece 12 and projection 15 from crosspiece 13. The two projections overlap each other with their end areas 16 or 17 leaving a space between these end areas. The basic frame comprising the parallelogram guides 2, 3 as well as the connecting crosspieces 12, 13 also consists of metal, e.g. steel or aluminum alloy, and is cut in its raw state from a corresponding profile piece having a trapezoid cross section. Subsequently, the two projections 14, 15 are welded or screwed on. In the case of another embodiment the arrangement illustrated in FIG. 7 can be worked in one piece from solid material or be a high quality cast part.

For use as a weighing unit in a weighing machine of flat construction the arrangement, as shown in FIG. 8, is mounted by means of screws 27, 28 to a stationary base plate 50, the screws 27, 28 penetrating into threaded holes 29, 30 in crosspiece 12 or projection 14, respectively. The load plate 33 is secured by means of screws 31, 32, these screws 31, 32 engaging in threaded holes 34, 35 in crosspiece 13 or projection 15, respectively (FIGS. 8 and 9). The bending measuring body 20 is secured as an independent, construction unit to projection 14 by means of screw 19 and protrudes freely on one side. A force introducing element 102, which is mounted on the projection 15 and corresponds in its construction to that of the force introducing unit 22 according to FIGS. 4, 5 and 6, serves to introduce the force to be measured into the bent back arm 21 of the bending measuring body 20. In contrast to the force introducing unit 22 the force introducing unit 102 need not be designed to be transversely displaceable.

The headless screw 42 (cf. FIG. 10) serves as described above as an adjustable overload stop. The pin 43 provided on the screw 42, which pin dips into the recess 44, prevents a twisting of the arrangement and in particular of the parallelogram guides 2, 3 in the plane of drawing of FIG. 9. A screw 45 with head 46 (cf. FIG. 6) could be screwed into the screw 42 and the pin 43 in order to prevent an excessive spreading apart of the two projections 14, 15 relative to each other. Such an undesired spreading apart is to be taken particularly into account when a loadplate forming a large lever arm is mounted on the projection 15. The load plate is again mounted on the force measuring device according to the embodiment of FIGS. 7 to 10 such that, in order to achieve the same strain on the joints of the parallelogram guides, the centre of its area lies above the point of intersection of the mid-verticals of the two parallelogram guides. The mid-verticals are thereby erected in the centre between the joint positions 8, 9 or 10, 11, respectively.

Otherwise the embodiment of the force measuring device according to FIGS. 7 to 10 functions the same as that according to FIGS. 1 to 6. Adjustment of corner sensitivity is carried out for the embodiment according to FIGS. 7 to 10 in the first main axis by alteration of the central, vertical spacings between the joints 8, 9 or 10, 11 on parallelogram guide 2. The other main axis is adjusted accordingly on the other parallelogram guide 3; the joint spacings are altered each time by corresponding milling or grinding of the relevant joint positions. Since adjustment of the corner sensitivity relating to the two main axes (running vertically to each other) is carried out on one or other of the parallelogram guides in the way described the force introducing unit 102 need not be disposed for transverse displacement, which means a certain simplification in construction in relation to the embodiment according to FIGS. 4, 5 and 6.

An additional advantage of the embodiment according to FIGS. 7 to 10 is that more space is available between the parallelogram guides 2 and 3 which makes installation of the bending measuring body much simpler. In addition, the arrangement has the same high rigidity relative to eccentric load in the two main axes and two equivalent adjustment axes are provided.

In the case of the embodiments of weighing units described up to now the bending measuring body 20 is used as an independent constructional unit. In principle it is, however, possible to provide the bending measuring body in one piece together with the other parts worked in particular from one block. The two projections 14 and 15 provided on the crosspieces 12, 13 in the centre of the free space between the parallelogram guides 2, 3 could thus be connected by an element connected in one piece with each projection, which element serves as a bending measuring body. In this case as well a weighing unit of low constructional height could be realised whereby the arrangement of the part forming the bending measuring body between the two parallelogram guides could easily be made such that it is easily accessible for mounting and encapsulating the wire strain gauges. It is a particular advantage to design the bending measuring body in this case as described in DE-OS No. 30 43 139.

FIG. 11, which corresponds to FIG. 4, shows a modified, particularly preferred force introducing unit 122 having an elastic force introducing effect. The elastic force introducing unit 122 comprises a socket 124 secured in the bent back arm 21 of the bending measuring body 20 as well as a threaded piece 125 secured in the projection 15, these two elements being connected with each other via a bendable elastic pressure rod 126.

The elastic force introducing unit 122 (socket 124, threaded piece 125 and bendable elastic pressure rod 126) can be designed as a unit turned from a single piece or consist of three individual pieces: socket 124, threaded piece 125 and pressure rod 126, whereby the pressure rod 126 manufactured from elastic material (e.g. spring steel) is firmly pressed into the threaded piece 125 and the socket 124.

The force introducing unit 122 can be advantageously modified (cf. in particular reference numeral 102 in FIGS. 8 and 10 with relevant text) to such an extent that the elastic pressure rod 126 is rotatably inserted in the threaded piece 125 or the socket 124.

In the case of the embodiment according to FIG. 11 and also in the case of the other embodiment dealt with above the force introducing unit 122 can also be designed such that its effective length between the bent back arm 21 of the bending measuring body 20 and the projection 15 can be altered in both directions, i.e. reduced or increased, for the purpose of setting the initial stress in the bending measuring body 20. The best way of doing this is by means of the above-mentioned one-piece design of socket 124, threaded piece 125 and pressure rod 126, the socket 124 thereby being securely mounted in the bent back arm 21 and the threaded piece being disposed in the projection 15 so as to be vertically adjustable.

In the case of the preferred embodiment of the invention the, for example, rectangular load plate 33 (cf. FIGS. 2, 8 and 11) is to be secured in the threaded holes 34, 35 such that the centre of its area is directly above the force introducing unit 22 or 102 or 122.

FIGS. 12 to 19 relate to the further elimination of measurement errors in force measuring devices according to the invention having at least one parallelogram guide worked in one piece.

Parallelogram guides of this type in single (FIG. 12) or double (FIGS. 1 and 7) construction may lose their guide effect relatively quickly when the eccentric load increases, this leading to measurement errors. An eccentric load may be given, for example when a load to be weighed is not placed in the centre of the area of the load plate carrying it.

The adjustment of the parallelogram guide(s) to a measurement error as low as possible, even with eccentric loads, may, as already mentioned, result from a one-sided, intentional increase or decrease in the central vertical joint spacing between two superposed joints of the parallelogram guide. However, this type of adjustment merely allows correction of those measurement errors resulting from eccentric load, which, when a load is applied, cause positive measurement errors on one side of the central point of the load plate and negative measurement errors on the other side, i.e. errors in opposite directions.

Apart from these easily corrected plus/minus errors so-called plus/plus or minus/minus measurement errors will occur when the eccentric load is increased. These are errors which are independent of the side, on which the load is eccentrically applied relative to the centre of the load plate. These measurement errors, which depend solely on the load, are not corrected in the case of known parallelogram guides and are not subsequently correctable. If the height of the parallelogram guide is to be decreased even further with a view to the flat construction of the weighing machine these "synonymous" measurement errors occurring due to eccentric load will be considerably increased due to the greater pulling and pressure forces in the guide.

In order to keep these disturbing measurement errors small the known parallelogram guides connected with weighing units must be of a relatively tall construction as well as rigid and bulky. This is a considerable cost disadvantage for, for example, a one-piece high quality casting (e.g. according to FIGS. 1 to 7) since the outer dimensions substantially determine the costs of manufacture. In addition, it is not possible to realise flat weighing machines with such relatively high arrangements.

FIGS. 12 to 19 relate to possibilities provided according to the invention for constructing a low parallelogram guide such that the above-mentioned, synonymous measurement errors, which are dependent on load and occur in the case of eccentric load, may be largely suppressed or subsequently compensated for.

The parallelogram guide 201 schematically illustrated in FIG. 12, which may be provided as a single guide as well as a double guide according to FIGS. 1 or 7, has four joint positions 202, 203, 204 and 205 constructed in the same way. As also illustrated schematically in FIG. 12 the parallelogram guide bears upon a force measuring device 206, also only schematically illustrated, by means of a lateral projection when a deformation occurs due to load. The load results via the load plate 33 connected with the guide 201. A load L to be weighed is disposed in the centre of the plate 33—drawn in solid lines. If this load L is moved to the left or right of the centre of the area and thus displaced to the positions on the load plate 33 designated at 207 and 208—drawn in FIG. 12 in dotted lines - an eccentric load on the parallelogram guide 201 will occur, this load leading to the above-mentioned, synonymous measurement errors according to the corresponding load L. The moments resulting from this, which cause the measurement errors, are to be eliminated, as described below, so that a pure force bears upon the force measuring device 206. In practice, the force measuring device 206 may be designed as a bending measuring body and be disposed as described in conjunction with the embodiment of the invention according to FIGS. 1 or 7. Alternatively, wire strain gauges 209, 210, 211 and 212 may be provided in the known way as force measuring elements. These wire strain gauges are disposed near the joint positions 202, 203, 204 or 205, respectively.

It was discovered that the plus/plus or minus/minus errors in question may be eliminated or compensated for in that at least one additional weak point 213 is worked into the parallelogram guide. In FIG. 12 this weak point is disposed in the lever 214 near to the joint position 204 and is in the form of a transversely continuous slot or groove of rectangular cross section. When an eccentric load occurs due to load L being in position 207 a pressure force will be generated in the lever 214 parallel to the longitudinal direction of the guide. This force gives rise, generated by the weak point 213, to a bending moment M on the joint position 204, indicated in FIG. 12 by an arrow. When the pressure increases the joint position 204 will be bent inwards when the weak point 213 is slightly deformed. This will shorten the central, vertical distance between joint positions 204 and 202. This decrease in distance will result in a slight vertical force used to correct the guide effect of guide 201, this vertical force also reducing the force on the force measuring device 206 originating from load L. If, as explained, a pressure force is generated in the lever 214 a pulling force directed in the opposite direction will always occur in lever 215 and vice versa.

When the eccentric load occurs in the position 208 of load L a pulling force is generated in lever 214 and a pressure force in lever 215. The pulling force in the lever 214 having the weak point 213 gives rise, due to this weak point, to a moment bearing on the joint position 204 which is the reverse of bending moment M. This joint position 204 will then be bent outwards. This will increase the central, vertical distance between the joint positions 204 and 202. This increase in distance will also result in a small, horizontally directed force in lever 214 due to the pulling force present; this force will reduce the force on force measuring device 206 originating from load L.

In both cases of eccentric load 207 or 208 a negative correcting force will be produced each time due to the additional weak point 213, this force increasing as the load force increases. The correcting force, which is negative in both cases, will be utilized directly to eliminate the plus/plus error occurring with increasing eccentric load at the parallelogram guide modified by the weak point 213.

The correcting effect, which depends on the load, is adjustable, due to the position and shape of the additional weak point 213, to the corresponding, load-dependent measurement errors of the parallelogram guide; this will enable a sufficient error compensation to be carried out even if the eccentric loads are great.

In the case of minus/minus errors the weak point 213 will, according to the invention, be constructed on the other side of (in FIG. 12 from below) the lever 214 but also near the joint 204. It can also be constructed on the opposite joint 205 of the same lever 214 and still achieve the same compensating effect. The same measures carried out point symmetrically on the diagonally opposite joints also have the same compensating results.

For example, a weak point of corresponding shape inserted from below into the lever 215 in FIG. 12 to the left of joint position 203 would have the same effect as the illustrated weak point 213 near the joint position 204.

The load-dependent correcting effect on the fundamental behaviour of the parallelogram guide, which is sensitive to moments, can be adjusted by corresponding constructions and arrangements relative to the joint position. Such constructions and arrangements of weak points 213 are represented in FIGS. 13 to 17.

It could also be an advantage to have a plurality of additional weak points 213 on one or both levers 214, 215. An example is illustrated in FIG. 18.

FIG. 19 shows, in partial view, a parallelogram guide 301, with which the levers (FIG. 19 merely shows lever 314) have no specially designed joint positions. The lever 314 merges at point 304 with the body of the parallelogram guide 301 and acts as a leaf spring. The same applies for the opposite lever (corresponding to lever 215 in FIG. 12). With this embodiment of a parallelogram guide there is also the possibility of compensating for the measurement error in question due to arrangement of a weak point 313 in the way described above.

The additional weak points 213 described, which serve to compensate for measurement errors, are advantageously worked into the parallelogram guide 201 at the same time as the joint positions 202, 203, 204, 205. As the correcting effect of these weak points is easily pre-set it is normally unnecessary to carry out any compensation during adjustment of the parallelogram guide. This means that the weak points 213 can already be provided during manufacture of the guide. It is, however, also possible to insert the additional weak points 213 during subsequent adjustment of the parallelogram guide 201, e.g. by grinding or milling out, and to coordinate their effect.

If two parallelogram guides of the type given in FIGS. 12 to 19 are combined to form a "double guide" according to FIGS. 1 or 7 each individual parallelogram guide will be provided with a weak point 213, 313 near to a joint position. The weak point must in any case be provided at a distance from the central point between the two joint positions of a lever, i.e. be located nearer to a joint position.

I claim:

1. A device for measuring force comprising:
   first and second spaced parallelogram guides provided with a load supporting surface formed in a one-piece block;
   an independent bending measuring body mounted on said block equidistant between said guides;
   means for transmitting a force from a load bearing on said parallelogram guides to said bending measuring body;
   a pair of crosspieces which connect opposite ends of said first parallelogram guide to corresponding opposite ends of said second parallelogram guide;
   a first cantilevered projection protruding from one of said crosspieces equidistant from said parallelogram guides;
   a second cantilevered projection protruding from the other crosspiece equidistant from said parallelogram guides, the free ends of said first and second cantilevered projections overlapping each other;
   overload safety means between said overlapping ends for limiting the deflection of said first projection toward said second projection, said overload safety means comprising a screw inserted into the free end of said first projection to strike against the free end of the second projection when an overload occurs;

a plug-like extension of smaller diameter than the body of said screw, extending from said screw;
a corresponding recess in the free end of said second projection for accomodating said plug-like extension;
means for attaching said force transmitting means to said first projection; and
means for attaching said bending measuring body to said second projection;
whereby said force transmitting means loads said bending measuring body.

2. A device for measuring force comprising:
first and second spaced parallelogram guides provided with a load supporting surface formed in a one-piece block;
an independent bending measuring body mounted on said block equidistant between said guides;
means for transmitting a force from a load bearing on said parallelogram guides to said bending measuring body;
a pair of crosspieces which connect opposite ends of said first parallelogram guide to corresponding opposite ends of said second parallelogram guide;
a first cantilevered projection protruding from one of said crosspieces equidistant from said parallelogram guides;
a second cantilevered projection protruding from the other crosspiece equidistant from said parallelogram guides, the free ends of said first and second cantilevered projections overlapping each other;
screw means between said first and second cantilevered projections for preventing the overlapping ends thereof from excessively spreading apart from each other;
means for attaching said force transmitting means to said first projection; and
means for attaching said bending measuring body to said second projection;
whereby said force transmitting means loads said bending measuring body.

3. A device for measuring force comprising:
first and second spaced parallelogram guides provided with a load supporting surface formed in a one-piece block;
an independent bending measuring body mounted on said block equidistant between said guides;
means for transmitting a force from a load bearing on said parallelogram guides to said bending measuring body;
a pair of crosspieces which connect opposite ends of said first parallelogram guide to corresponding opposite ends of said second parallelogram guide;
a first cantilevered projection protruding from one of said crosspieces equidistant from said parallelogram guides;
a second cantilevered projection protruding from the other crosspiece equidistant from said parallelogram guides;
means for attaching said force transmitting means to said first projection;
means for attaching said bending measuring body to said second projection;
whereby said force transmitting means loads said bending measuring body; and
said first and second parallelogram guides being arranged relative to each other at an angle between about 60° and 120°.

4. The device of claim 3 wherein said first and second parallelogram guides are arranged relative to each other at an angle of 90°.

5. The device of claim 3 wherein the bending measuring body is accommodated by a groove constructed in said projections.

6. The device of claim 3 wherein said force transmitting means is adjustable in a direction transverse to said bending measuring body.

7. The device of claim 5 wherein said force transmitting means is adjustable in a direction transverse to said bending measuring body.

8. The device of claim 3 wherein said first and second parallelogram guides each comprise an upper arm and a lower arm connected at a plurality of joint positions, said device further comprising a load bearing plate mounted thereto with the center of the plate area spaced equidistant from the adjacent joint positions of the parallelogram guides.

9. The device of claim 3 further comprising a load bearing plate mounted thereto with the center of the plate area located above the point of intersection of a line equidistant from the ends of the upper and lower surfaces and normal to said first and second parallelogram guides.

10. The device of claim 3 wherein the free ends of said first and second cantilevered projections overlap each other.

11. The device of claim 10 further comprising overload safety means between said overlapping ends for limiting the deflection of said first projection toward said second projection.

12. The device of claim 11 wherein said overload safety means comprises a screw inserted into the free end of said first projection, said screw striking against the free end of the second projection when an overload occurs.

13. The device of claim 12 further comprising a plug-like extension, of smaller diameter than the body of said screw, extending from said screw and a corresponding recess in the free end of said second projection for accomodating said plug-like extension.

14. The device of claim 11 further comprising screw means between said first and second cantilevered projections for preventing the overlapping end areas of said first and second cantilevered projections from excessively spreading apart from each other.

15. The device of claim 3 wherein said force transmitting means comprises a bendable elastic pressure rod.

16. The device of claim 3 wherein said first and second parallelogram guides each comprise an upper arm and a lower arm and a pair of side arms connecting the adjacent ends of said upper and lower arms together, the upper and lower arms each having two joint positions and further comprising an additional weak point worked into at least one of said upper or lower arms for correcting load-dependent measurement errors in the case of an eccentric load.

* * * * *